(12) United States Patent
Carlson

(10) Patent No.: US 8,615,426 B2
(45) Date of Patent: Dec. 24, 2013

(54) COUPON OFFERS FROM MULTIPLE ENTITIES

(75) Inventor: Mark Carlson, Half Moon Bay, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 837 days.

(21) Appl. No.: 11/963,095

(22) Filed: Dec. 21, 2007

(65) Prior Publication Data

US 2008/0154727 A1    Jun. 26, 2008

Related U.S. Application Data

(60) Provisional application No. 60/871,898, filed on Dec. 26, 2006.

(51) Int. Cl.
*G06Q 30/00*    (2012.01)

(52) U.S. Cl.
USPC ............................................... 705/14.1

(58) Field of Classification Search
USPC ............................................... 705/14.1
See application file for complete search history.

(56) References Cited

U.S. PATENT DOCUMENTS

| | | |
|---|---|---|
| 3,356,021 A | 12/1967 | May et al. |
| 4,044,231 A | 8/1977 | Beck et al. |
| 4,613,904 A | 9/1986 | Lurie |
| 4,614,861 A | 9/1986 | Pavlov et al. |
| 4,674,041 A | 6/1987 | Lemon et al. |
| 4,701,601 A | 10/1987 | Francini et al. |
| 4,868,376 A | 9/1989 | Lessin et al. |
| 5,034,597 A | 7/1991 | Atsumi et al. |
| 5,305,196 A | 4/1994 | Deaton et al. |
| 5,327,508 A | 7/1994 | Deaton et al. |
| 5,353,218 A | 10/1994 | DeLapa et al. |
| 5,359,183 A | 10/1994 | Skodlar |
| 5,388,165 A | 2/1995 | Deaton et al. |
| RE34,915 E | 4/1995 | Nichtberger et al. |
| 5,420,606 A | 5/1995 | Begum et al. |
| 5,430,644 A | 7/1995 | Deaton et al. |

(Continued)

FOREIGN PATENT DOCUMENTS

| | | |
|---|---|---|
| CN | 101647038 A | 2/2010 |
| EP | 1 096 439 A2 | 5/2001 |

(Continued)

OTHER PUBLICATIONS

Written Opinion dated Jun. 10, 2008, corresponding to PCT Application No. PCT/2007/088615, filed Dec. 21, 2007.

(Continued)

*Primary Examiner* — Daniel Lastra
(74) *Attorney, Agent, or Firm* — Kilpatrick Townsend & Stockton LLP

(57) ABSTRACT

Offers from multiple entities provide an incentive for consumers to behave in a manner that is beneficial to the offer provider. Each offer is associated with rules that establish conditions that must be met for the offer to be valid. For example, a rule may be established to promote the use a specific form of payment, such as a particular credit card. Thus, the offer would only be valid if the consumer paid for the merchandise using the particular credit card. A merchant may generate its own offers or receive offers from a variety of sources (e.g., a payment processing organization, an issuer, or other external sources).

20 Claims, 6 Drawing Sheets

(56) References Cited

U.S. PATENT DOCUMENTS

| | | |
|---|---|---|
| 5,448,471 A | 9/1995 | Deaton et al. |
| 5,465,206 A | 11/1995 | Hilt et al. |
| 5,477,038 A | 12/1995 | Levine et al. |
| 5,483,444 A | 1/1996 | Heintzeman et al. |
| 5,500,513 A | 3/1996 | Langhans et al. |
| 5,502,636 A | 3/1996 | Clarke |
| 5,530,438 A | 6/1996 | Bickham et al. |
| 5,564,073 A | 10/1996 | Takahisa |
| 5,577,266 A | 11/1996 | Takahisa et al. |
| 5,579,537 A | 11/1996 | Takahisa |
| 5,592,560 A | 1/1997 | Deaton et al. |
| 5,604,921 A | 2/1997 | Alanara |
| 5,615,110 A | 3/1997 | Wong |
| 5,621,201 A | 4/1997 | Langhans et al. |
| 5,621,812 A | 4/1997 | Deaton et al. |
| 5,627,549 A | 5/1997 | Park |
| 5,638,457 A | 6/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,659,165 A | 8/1997 | Jennings et al. |
| 5,659,469 A | 8/1997 | Deaton et al. |
| 5,675,662 A | 10/1997 | Deaton et al. |
| 5,678,939 A | 10/1997 | Ross |
| 5,687,322 A | 11/1997 | Deaton et al. |
| 5,708,422 A | 1/1998 | Blonder et al. |
| 5,710,886 A | 1/1998 | Christensen et al. |
| 5,717,866 A | 2/1998 | Naftzger |
| 5,761,648 A | 6/1998 | Golden et al. |
| 5,777,903 A | 7/1998 | Piosenka et al. |
| 5,791,991 A | 8/1998 | Small |
| 5,793,972 A | 8/1998 | Shane |
| 5,806,044 A | 9/1998 | Powell |
| 5,822,735 A | 10/1998 | De Lapa et al. |
| 5,855,007 A | 12/1998 | Jovicic et al. |
| 5,870,030 A | 2/1999 | DeLuca et al. |
| 5,884,277 A | 3/1999 | Khosla |
| 5,905,246 A | 5/1999 | Fajkowski |
| 5,907,830 A | 5/1999 | Engel et al. |
| 5,924,080 A | 7/1999 | Johnson |
| 5,959,577 A | 9/1999 | Fan et al. |
| 5,974,399 A | 10/1999 | Giuliani et al. |
| 5,991,749 A | 11/1999 | Morrill, Jr. |
| 6,002,771 A | 12/1999 | Nielsen |
| 6,009,411 A | 12/1999 | Kepecs |
| 6,009,415 A | 12/1999 | Shurling et al. |
| 6,012,038 A | 1/2000 | Powell |
| 6,014,634 A | 1/2000 | Scroggie et al. |
| 6,018,718 A | 1/2000 | Walker et al. |
| 6,029,151 A | 2/2000 | Nikander |
| 6,035,280 A | 3/2000 | Christensen |
| 6,041,309 A | 3/2000 | Laor |
| 6,049,778 A | 4/2000 | Walker et al. |
| 6,055,505 A | 4/2000 | Elston |
| 6,062,991 A | 5/2000 | Moriarty et al. |
| 6,064,990 A | 5/2000 | Goldsmith |
| 6,067,526 A | 5/2000 | Powell |
| 6,067,529 A | 5/2000 | Ray et al. |
| 6,076,068 A | 6/2000 | DeLapa et al. |
| 6,076,069 A | 6/2000 | Laor |
| 6,076,101 A | 6/2000 | Kamakura et al. |
| 6,128,599 A | 10/2000 | Walker et al. |
| 6,185,290 B1 | 2/2001 | Shaffer et al. |
| 6,185,541 B1 | 2/2001 | Scroggie et al. |
| 6,227,447 B1 | 5/2001 | Campisano |
| 6,237,145 B1 | 5/2001 | Narasimhan et al. |
| 6,247,129 B1 | 6/2001 | Keathley et al. |
| 6,267,292 B1 | 7/2001 | Walker et al. |
| 6,279,112 B1 | 8/2001 | O'Toole, Jr. et al. |
| 6,292,786 B1 | 9/2001 | Deaton et al. |
| 6,307,958 B1 | 10/2001 | Deaton et al. |
| 6,318,631 B1 | 11/2001 | Halperin |
| 6,321,208 B1 | 11/2001 | Barnett et al. |
| 6,321,339 B1 | 11/2001 | French |
| 6,330,543 B1 | 12/2001 | Kepecs |
| 6,330,550 B1 | 12/2001 | Brisebois et al. |
| 6,334,108 B1 | 12/2001 | Deaton et al. |
| 6,336,098 B1 | 1/2002 | Fortenberry et al. |
| 6,336,099 B1 | 1/2002 | Barnett et al. |
| 6,341,724 B2 | 1/2002 | Campisano |
| 6,351,735 B1 | 2/2002 | Deaton et al. |
| 6,377,935 B1 | 4/2002 | Deaton et al. |
| 6,378,775 B2 | 4/2002 | Hayashida |
| 6,381,324 B1 | 4/2002 | Shaffer et al. |
| 6,424,949 B1 | 7/2002 | Deaton et al. |
| 6,424,951 B1 | 7/2002 | Shurling et al. |
| 6,434,534 B1 | 8/2002 | Walker et al. |
| 6,470,181 B1 | 10/2002 | Maxwell |
| 6,484,146 B2 | 11/2002 | Day et al. |
| 6,488,203 B1 | 12/2002 | Stoutenburg et al. |
| 6,505,046 B1 | 1/2003 | Baker |
| 6,516,302 B1 | 2/2003 | Deaton et al. |
| 6,529,725 B1 | 3/2003 | Joao et al. |
| 6,535,855 B1 | 3/2003 | Cahill et al. |
| 6,560,581 B1 | 5/2003 | Fox et al. |
| 6,584,309 B1 | 6/2003 | Whigham |
| 6,587,835 B1 | 7/2003 | Treyz et al. |
| 6,594,376 B2 | 7/2003 | Hoffman et al. |
| 6,601,759 B2 | 8/2003 | Fife et al. |
| 6,609,104 B1 | 8/2003 | Deaton et al. |
| 6,611,811 B1 | 8/2003 | Deaton et al. |
| 6,631,849 B2 | 10/2003 | Blossom |
| 6,647,257 B2 | 11/2003 | Owensby |
| 6,647,269 B2 | 11/2003 | Hendrey et al. |
| 6,664,948 B2 | 12/2003 | Crane et al. |
| 6,684,195 B1 | 1/2004 | Deaton et al. |
| 6,685,093 B2 | 2/2004 | Challa et al. |
| 6,736,322 B2 | 5/2004 | Gobburu et al. |
| 6,747,547 B2 | 6/2004 | Benson |
| 6,749,118 B2 | 6/2004 | Kobayashi et al. |
| 6,775,539 B2 | 8/2004 | Deshpande |
| 6,832,721 B2 | 12/2004 | Fujii |
| 6,837,425 B2 | 1/2005 | Gauthier et al. |
| 6,857,073 B2 | 2/2005 | French |
| 6,868,391 B1 | 3/2005 | Hultgren |
| 6,877,665 B2 | 4/2005 | Challa et al. |
| 6,892,941 B2 | 5/2005 | Rosenblum |
| 6,912,398 B1 | 6/2005 | Domnitz |
| 6,920,611 B1 | 7/2005 | Spaeth et al. |
| 6,975,852 B1 | 12/2005 | Sofer et al. |
| 6,978,308 B2 | 12/2005 | Boden |
| 6,990,330 B2 | 1/2006 | Voerepalli et al. |
| 7,003,493 B2 | 2/2006 | Weichert |
| 7,003,497 B2 | 2/2006 | Maes |
| 7,007,840 B2 | 3/2006 | Davis |
| 7,013,286 B1 | 3/2006 | Aggarwal et al. |
| 7,025,256 B1 | 4/2006 | Drummond et al. |
| 7,028,906 B2 | 4/2006 | Challa et al. |
| 7,039,611 B2 | 5/2006 | Devine |
| 7,040,533 B1 | 5/2006 | Ramachandran |
| 7,051,923 B2 | 5/2006 | Nguyen et al. |
| 7,055,031 B2 | 5/2006 | Platt |
| 7,076,329 B1 | 7/2006 | Kolls |
| 7,089,208 B1 | 8/2006 | Levchin et al. |
| 7,099,850 B1 | 8/2006 | Mann et al. |
| 7,104,446 B2 | 9/2006 | Bortolin et al. |
| 7,107,250 B2 | 9/2006 | Harrison |
| 7,110,954 B2 | 9/2006 | Yung et al. |
| 7,121,456 B2 | 10/2006 | Spaeth et al. |
| 7,124,937 B2 | 10/2006 | Myers et al. |
| 7,150,393 B1 | 12/2006 | Drummond et al. |
| 7,152,780 B2 | 12/2006 | Gauthier et al. |
| 7,159,770 B2 | 1/2007 | Onozu et al. |
| 7,177,830 B2 | 2/2007 | Shields |
| 7,194,437 B1 | 3/2007 | Britto et al. |
| 7,201,313 B1 | 4/2007 | Ramachandran |
| 7,203,300 B2 | 4/2007 | Shaffer et al. |
| 7,207,477 B1 | 4/2007 | Ramachandran |
| 7,213,755 B2 | 5/2007 | Newsome et al. |
| 7,231,357 B1 | 6/2007 | Shanman |
| 7,231,372 B1 | 6/2007 | Prange et al. |
| RE39,736 E | 7/2007 | Morrill, Jr. |
| 7,243,853 B1 | 7/2007 | Levy et al. |
| 7,257,545 B1 | 8/2007 | Hung |

(56) References Cited

U.S. PATENT DOCUMENTS

| | | |
|---|---|---|
| 7,280,981 B2 | 10/2007 | Huang et al. |
| 7,290,704 B1 | 11/2007 | Ball et al. |
| 7,308,254 B1 | 12/2007 | Rissanen |
| 7,343,149 B2 | 3/2008 | Benco et al. |
| 7,350,702 B2 | 4/2008 | Bortolin et al. |
| 7,353,187 B1 | 4/2008 | Emodi et al. |
| 7,356,516 B2 | 4/2008 | Richey et al. |
| 7,357,310 B2 | 4/2008 | Calabrese et al. |
| 7,407,094 B2 | 8/2008 | Myers et al. |
| 7,440,771 B2 | 10/2008 | Purk |
| 7,447,662 B2 | 11/2008 | Gibson |
| 7,464,867 B1 | 12/2008 | Kolls |
| 7,653,599 B2 | 1/2010 | Doran et al. |
| 2001/0013542 A1 | 8/2001 | Horowitz et al. |
| 2002/0013711 A1 | 1/2002 | Ahuja et al. |
| 2002/0062249 A1* | 5/2002 | Iannacci .................. 705/14 |
| 2002/0065713 A1 | 5/2002 | Awada et al. |
| 2002/0091569 A1 | 7/2002 | Kitaura et al. |
| 2002/0128903 A1 | 9/2002 | Kernahan |
| 2002/0161701 A1 | 10/2002 | Warmack |
| 2002/0165775 A1 | 11/2002 | Tagseth et al. |
| 2002/0169719 A1 | 11/2002 | Dively et al. |
| 2002/0190118 A1 | 12/2002 | Davenport et al. |
| 2002/0198777 A1 | 12/2002 | Yuasa |
| 2003/0004808 A1 | 1/2003 | Elhaoussine |
| 2003/0058261 A1 | 3/2003 | Challa et al. |
| 2003/0120593 A1 | 6/2003 | Bansal et al. |
| 2003/0126078 A1 | 7/2003 | Vihinen |
| 2003/0144907 A1 | 7/2003 | Cohen et al. |
| 2003/0172040 A1 | 9/2003 | Kemper et al. |
| 2003/0208406 A1 | 11/2003 | Okamoto et al. |
| 2003/0212595 A1 | 11/2003 | Antonucci |
| 2003/0212642 A1 | 11/2003 | Weller et al. |
| 2003/0225618 A1 | 12/2003 | Hessburg et al. |
| 2003/0230630 A1 | 12/2003 | Whipple et al. |
| 2003/0233292 A1 | 12/2003 | Richey et al. |
| 2004/0019522 A1 | 1/2004 | Bortolin et al. |
| 2004/0044621 A1 | 3/2004 | Huang et al. |
| 2004/0049455 A1 | 3/2004 | Mohsenzadeh |
| 2004/0050922 A1 | 3/2004 | Gauthier et al. |
| 2004/0054575 A1 | 3/2004 | Marshall |
| 2004/0054581 A1 | 3/2004 | Redford et al. |
| 2004/0054590 A1 | 3/2004 | Redford et al. |
| 2004/0054591 A1 | 3/2004 | Spaeth et al. |
| 2004/0064406 A1 | 4/2004 | Yates et al. |
| 2004/0117254 A1 | 6/2004 | Nemirofsky et al. |
| 2004/0133653 A1 | 7/2004 | Defosse et al. |
| 2004/0139021 A1 | 7/2004 | Reed et al. |
| 2004/0148224 A1 | 7/2004 | Gauthier et al. |
| 2004/0153715 A1 | 8/2004 | Spaeth et al. |
| 2004/0199470 A1 | 10/2004 | Ferry, Jr. et al. |
| 2004/0220964 A1 | 11/2004 | Shiftan et al. |
| 2004/0243519 A1 | 12/2004 | Perttila et al. |
| 2004/0254848 A1 | 12/2004 | Golan et al. |
| 2004/0260653 A1 | 12/2004 | Tsuei et al. |
| 2005/0021456 A1 | 1/2005 | Steele et al. |
| 2005/0029344 A1 | 2/2005 | Davis |
| 2005/0035847 A1 | 2/2005 | Bonalle et al. |
| 2005/0036611 A1 | 2/2005 | Seaton, Jr. et al. |
| 2005/0045718 A1 | 3/2005 | Bortolin et al. |
| 2005/0058427 A1 | 3/2005 | Nguyen et al. |
| 2005/0071225 A1 | 3/2005 | Bortolin et al. |
| 2005/0071226 A1 | 3/2005 | Nguyen et al. |
| 2005/0071227 A1 | 3/2005 | Hammad et al. |
| 2005/0071228 A1 | 3/2005 | Bortolin et al. |
| 2005/0071235 A1 | 3/2005 | Nguyen et al. |
| 2005/0075958 A1 | 4/2005 | Gonzalez |
| 2005/0097473 A1 | 5/2005 | Malik et al. |
| 2005/0102233 A1 | 5/2005 | Park et al. |
| 2005/0102234 A1 | 5/2005 | Devine |
| 2005/0121506 A1 | 6/2005 | Gauthier et al. |
| 2005/0149455 A1 | 7/2005 | Bruesewitz et al. |
| 2005/0177510 A1 | 8/2005 | Hilt et al. |
| 2005/0199714 A1 | 9/2005 | Brandt et al. |
| 2005/0210387 A1 | 9/2005 | Alagappan et al. |
| 2005/0219061 A1 | 10/2005 | Lai et al. |
| 2005/0222933 A1 | 10/2005 | Wesby |
| 2005/0283416 A1 | 12/2005 | Reid et al. |
| 2005/0283430 A1 | 12/2005 | Reid et al. |
| 2005/0283431 A1 | 12/2005 | Reid et al. |
| 2005/0283432 A1 | 12/2005 | Reid et al. |
| 2005/0283433 A1 | 12/2005 | Reid et al. |
| 2006/0053056 A1 | 3/2006 | Alspach-Goss et al. |
| 2006/0059110 A1 | 3/2006 | Madhok et al. |
| 2006/0080243 A1 | 4/2006 | Kemper et al. |
| 2006/0085260 A1 | 4/2006 | Yamagishi |
| 2006/0111967 A1 | 5/2006 | Forbes |
| 2006/0155644 A1 | 7/2006 | Reid et al. |
| 2006/0163345 A1 | 7/2006 | Myers et al. |
| 2006/0178957 A1 | 8/2006 | LeClaire |
| 2006/0179007 A1 | 8/2006 | Davis |
| 2006/0202025 A1 | 9/2006 | Calabrese et al. |
| 2006/0206376 A1 | 9/2006 | Gibbs et al. |
| 2006/0218086 A1 | 9/2006 | Campbell et al. |
| 2006/0224449 A1 | 10/2006 | Byerley et al. |
| 2006/0248007 A1 | 11/2006 | Hofer et al. |
| 2006/0253390 A1 | 11/2006 | McCarthy et al. |
| 2006/0270421 A1 | 11/2006 | Phillips et al. |
| 2006/0282382 A1 | 12/2006 | Balasubramanian et al. |
| 2006/0290501 A1 | 12/2006 | Hammad et al. |
| 2006/0293027 A1 | 12/2006 | Hammad et al. |
| 2007/0001000 A1 | 1/2007 | Nguyen et al. |
| 2007/0001001 A1 | 1/2007 | Myers et al. |
| 2007/0005613 A1 | 1/2007 | Singh et al. |
| 2007/0005774 A1 | 1/2007 | Singh et al. |
| 2007/0012764 A1 | 1/2007 | Bortolin et al. |
| 2007/0017970 A1 | 1/2007 | Gauthier et al. |
| 2007/0034679 A1 | 2/2007 | Gauthier et al. |
| 2007/0055597 A1 | 3/2007 | Patel et al. |
| 2007/0055630 A1 | 3/2007 | Gauthier et al. |
| 2007/0057034 A1 | 3/2007 | Gauthier et al. |
| 2007/0057051 A1 | 3/2007 | Bortolin et al. |
| 2007/0083465 A1 | 4/2007 | Ciurea et al. |
| 2007/0100691 A1 | 5/2007 | Patterson |
| 2007/0125842 A1 | 6/2007 | Antoo et al. |
| 2007/0194104 A1 | 8/2007 | Fukuda |
| 2007/0203836 A1 | 8/2007 | Dodin |
| 2007/0205270 A1 | 9/2007 | Kemper et al. |
| 2007/0241189 A1 | 10/2007 | Slavin et al. |
| 2007/0244811 A1 | 10/2007 | Tumminaro |
| 2007/0250380 A1 | 10/2007 | Mankoff |
| 2007/0276764 A1 | 11/2007 | Mann |
| 2007/0288373 A1 | 12/2007 | Wilkes |
| 2008/0003987 A1 | 1/2008 | Mechaley |
| 2008/0006685 A1 | 1/2008 | Rackley, III et al. |
| 2008/0021784 A1 | 1/2008 | Hessburg et al. |
| 2008/0040265 A1 | 2/2008 | Rackley, III et al. |
| 2008/0114657 A1 | 5/2008 | Forzley |
| 2008/0120182 A1 | 5/2008 | Arnold et al. |
| 2008/0133366 A1 | 6/2008 | Evans et al. |
| 2008/0154735 A1 | 6/2008 | Carlson |
| 2008/0154772 A1 | 6/2008 | Carlson |
| 2008/0163257 A1 | 7/2008 | Carlson |
| 2008/0167991 A1 | 7/2008 | Carlson et al. |
| 2008/0183480 A1 | 7/2008 | Carslon |
| 2008/0201226 A1 | 8/2008 | Carlson |
| 2008/0208762 A1 | 8/2008 | Arthur et al. |
| 2008/0300973 A1 | 12/2008 | DeWitt et al. |
| 2008/0319843 A1 | 12/2008 | Moser et al. |
| 2009/0076896 A1 | 3/2009 | DeWitt et al. |
| 2009/0076925 A1 | 3/2009 | DeWitt et al. |
| 2009/0078777 A1 | 3/2009 | Granucci et al. |
| 2009/0081990 A1 | 3/2009 | Granucci et al. |
| 2009/0112721 A1 | 4/2009 | Hammad et al. |
| 2009/0119170 A1 | 5/2009 | Hammad et al. |
| 2009/0182634 A1 | 7/2009 | Park et al. |
| 2009/0314840 A1 | 12/2009 | Granucci et al. |
| 2009/0327134 A1 | 12/2009 | Carlson et al. |
| 2009/0327151 A1 | 12/2009 | Carlson et al. |
| 2010/0017275 A1 | 1/2010 | Carlson et al. |

(56) References Cited

U.S. PATENT DOCUMENTS

FOREIGN PATENT DOCUMENTS

| EP | 1 136 961 A1 | 9/2001 |
|---|---|---|
| EP | 1178421 A2 | 2/2002 |
| GB | 2 348 781 B | 11/2003 |
| JP | 2002-117313 A | 4/2002 |
| KR | 09-104069 | 10/2009 |
| WO | WO 96/13814 A1 | 5/1996 |
| WO | WO 97/45814 A1 | 12/1997 |
| WO | WO 99/51038 A1 | 7/1999 |
| WO | WO 00/03328 A1 | 1/2000 |
| WO | WO 00/77697 A1 | 12/2000 |
| WO | WO 2004/077369 A1 | 9/2004 |
| WO | WO 2005/052869 A1 | 6/2005 |
| WO | WO 2006/024080 A1 | 3/2006 |

OTHER PUBLICATIONS

"GSMVend Technical Manual"; http://www.bonusdata.net/IntusJunior/GSMVend/gsmvend.htm, 14 pages.
"M Pay: Frequently Asked Questions"; http://www.m-pay.com/index.php?id=18, 5 pages.
"Ubiquitous Commerce"; http://www.accenture.com/Global/Services/Accenture_Technology_Labs/R_and_I/Mobile . . . , 2 pages.
"Virtual Shopping: Straight Goods on Cyber-stores and Security." *Chatelaine;* vol. 70, p. 24 (Feb. 1997).
"SmarTrip More Than a Smart Card. Its Pure Genius", 1998-2004, WMATA, http://www.wmata.com/riding/smartrip.cfm (2 pages).
"Adding value to SmarTrip is as easy as using it", 1998-2004, WMATA, http://www.wmata.com/riding/smartrip_adding_value.cfm (1 page).
About Us, 1 page downloaded from http://www.cellfire.com/about-us/ on May 10, 2007, 1 page.
bCode™ is the future of Mobile Coupon, Ticketing, Loyalty and Payments, 2 page product brochure downloaded from http://www.bcode.com on May 11, 2007, 2 pages.
bCode™ MediaHub 200 Mobile Coupon, Ticketing Loyalty and Payments, 2 page product brochure, from http://www.bcode.com/news_media.htm on May 11, 2007, 2 pages.
Cellfire—Mobile coupons for your cell phone, 1 page product brochure downloaded from http://www.cellfire.com on May 11, 2007, 1 page.
Cellfire, Coupons on Cellfire, 2 pages downloaded from http://www.cellfire.com/coupons on May 10, 2007, 2 pages.
International Preliminary Report on Patentability from International Application No. PCT/US2007/088289 dated Jun. 30, 2009.
International Preliminary Report on Patentability from International Application No. PCT/US2007/088313 dated Jun. 30, 2008.
International Preliminary Report on Patentability from International Application No. PCT/US2007/088687 dated Jun. 30, 2009.
International Preliminary Report on Patentability from PCT/US2007/088563, dated Jul. 9, 2009.
International Search Report and Written Opinion from International Application No. PCT/US2007/088313, dated Jun. 30, 2008.
International Search Report from PCT/US2007/088563, dated May 20, 2008.
Emmerson, Kassidy; "The History of PayPal: One of the Most Successful Online Money Transmitters Today"; 2009, http://www.associatedcontent.com/pop_print.shtml?content_type=arti . . . , 1 page.
Kageyama, Yuri; "Japanese carrier unveils mobile-phone wallet"; http://usatoday.printthis.clickability.com/pt/cpt?action=cpt &title=USATODAY.com+-+Jap . . . , 3 pages.
Korousic, Bojan et al.; "3rd Year Project Report EZ-Ca$h: Feasibility Project"; 2003, *Electronics Engineering Technology-Telecommunications Systems, Conestoga College,* 33 pages.
Press Release, "Three months after California release, Cellfire™ reports redemption rates n times greater than paper coupons," issued by Cellfire, Inc. Mar. 22, 2006; pp. 1-2 downloaded from http://www.cellfire.com/about-us/articles/2006-03-22_redemption-rate, 2 pages.
Purdy et al., "When Mobile Coupons Replace Paper Coupons, Everyone Wins," pp. 1-17 published by Frost & Sullivan.[online]. info.cellfire.com, May 11, 2007, [Retrieved from the Internet: URL: http://info.cellfire.com/cellfire/themes/cellfire/downloads/When_Mobile_Coupons_Replace_Paper_Coupons.pdf], 17 pages.
Subramanian, Hemang C.; "SIM Access Profile: Electronic currency using SIM Access Profile"; 2003, http:/www-128.ibm.com/developerworks/wireless/library/wi-simacc/, 6 pages.
Japanese Office Action mailed Jul. 31, 2012 in Japanese Application No. 2009-544226, 5 pages.
Chinese Office Action mailed Mar. 11, 2011 in Chinese Application No. 200780050662.8, 19 pages.
Chinese Office Action mailed Jan. 18, 2012 in Chinese Application No. 200780050662.8, 21 pages.
PCT International Preliminary Report issued on Jan. 5, 2010 in PCT/US2008/067994, 1 page.
Written Opinion of the International Searching Authority mailed Jan. 9, 2009 in PCT/US2008/067994, 6 pages.
International Preliminary Report issued on Jun. 30, 2009 in PCT Application No. PCT/US2007/088615, 1 page.
International Search Report and Written Opinion mailed on Jun. 10, 2008 in PCT Application No. PCT/US2007/088615, 5 pages.
Extended European Search Report mailed Dec. 15, 2011 in PCT Application No. PCT/US2007/088615, 6 pages.
International Searching Authority, United States Patent & Trademark Office, International Search Report for International Patent Application No. PCT/US2007/088615, 2 pages (Date completed: May 27, 2008).

* cited by examiner

PAYMENT OPTIONS

If you pay by cash or check, the total is $96.21

If you pay with a payment card branded with Payment Processing Organization Z, the total is $86.21

If you pay with a payment card branded with Issuer A, the total is $91.21

If you pay with a payment card branded with Issuer A and Payment Processing Organization Z, the total is $80.01

COUPON OFFERS FROM MULTIPLE ENTITIES

CROSS-REFERENCES TO RELATED APPLICATIONS

The present application claims priority from U.S. Provisional Patent Application No. 60/871,898, filed Dec. 26, 2006, which is incorporated by reference herein in its entirety.

BACKGROUND

A coupon is a ticket or a document that can be exchanged for a financial discount or rebate when purchasing a product. Coupons provide a popular method to promote the sale of goods and services. Customarily, coupons are issued by manufacturers of consumer packaged goods or by retailers to be used in retail stores as a part of sales promotions. Coupons are often widely distributed through mail, magazines, newspapers, the Internet, and mobile devices such as cell phones.

To redeem a coupon, a consumer presents merchandise to be purchased to a cashier at a retail outlet. After the merchandise is scanned for purchase, the consumer provides the coupon to the cashier. The cashier then scans or keys in the coupon at a cash register. Conventional coupons only relay a limited amount of information to the cash register. Examples of data relayed to the cash register include a coupon number, an expiration date, a number of redeemed coupons, and the product for which the coupon is applicable. The cash register uses this information to access a local database and accept or reject the offer provided by the coupon. The coupons corresponding to the accepted offers are applied to the corresponding goods.

Coupons are generally issued by merchants and manufacturers to promote particular goods. However, other entities may also wish to influence consumer behavior. What is needed is a method to provide different entities such as a merchant, a payment processing organization, and an issuer with a means to provide offers to a consumer.

BRIEF SUMMARY

Embodiments of the invention are directed to providing coupon offers from multiple entities to consumers. The offers provide an incentive for consumers to behave in a manner that is beneficial to the offer provider. Each offer is associated with rules that establish conditions that must be satisfied for the offer to be valid. For example, a rule may be established to promote the use of a specific form of payment, such as a particular credit card. Thus, the offer would only be valid if the consumer paid for the merchandise using the particular credit card. A merchant may generate its own offers or receive offers from a variety of sources (e.g., a payment processing organization, an issuer, or other external sources). Such offers may be generated in real time or during the transaction in embodiments of the invention.

Illustratively, a consumer shops for goods in a store. A merchant computer (e.g., a cash register) retrieves a SKU or barcode value associated with the goods to be purchased, or data associated with the goods to be purchased is manually entered into the merchant computer. The consumer provides at least one coupon that may be scanned or manually entered into the merchant computer. A server computer communicates with the merchant computer and a computer associated with the entity which provides the coupon to determine if rules associated with the coupon are satisfied. If the rules are satisfied, the savings provided by the coupon is subtracted from a total of the cost of the goods to be purchased. The new total is then presented to the consumer.

In an illustrative example, the consumer may have a coupon that provides an incentive to purchase the goods using a particular form of payment. For example, the goods to be purchased may be associated with one total that applies to a cash payment, a lower total if payment is made using a payment processing organization-sponsored card (e.g., a Visa card), and another lower total if payment is completed with a particular issuer's credit card. After the goods are scanned at the cash register, the consumer presents the coupon that provides a discount offer if a particular credit card is used. The consumer may then swipe the particular credit card at a point of sale terminal associated with the cash register. The merchant computer accesses a computer associated with the offer provider to determine whether the rules associated with the offer are satisfied. For example, the merchant computer access a rules engine in a computer associated with the particular credit card issuer to determine that the credit card swiped by the consumer at the point of sale corresponds to the particular credit card. After the rules engine determines that the rules associated with the offer are satisfied, the discounted total is presented to the consumer at the point of sale terminal. The point of sale terminal may also prompt the consumer to submit payment. The consumer then selects to pay for the goods such that the discounted total is charged to the particular credit card.

One embodiment of the invention is directed to a method including receiving a consumer identifier and an offer during a transaction. A validated offer is received from an entity which provides the offer, such as a payment processing organization or an issuer, when rules associated with the offer are satisfied. The offer is validated based on the consumer identifier. A selection of the valid offer is received to complete the transaction.

Another embodiment of the invention is directed to a method including receiving an offer and a consumer identifier for a consumer during a transaction and receiving a validated offer. The offer is validated by an entity which provides the offer when rules associated with the offer are satisfied. The offer is validated based on the consumer identifier. A selection of the validated offer is received to complete the transaction.

Another embodiment of the invention is directed to a system including an access device and a server computer in communication with the access device. The access device or the server computer is configured to: receive a consumer identifier and an offer during a transaction conducted with the access device and the server computer; receive a validated offer from an entity which provides the offer, wherein the offer is validated when rules associated with the offer are satisfied, the offer being validated based on the consumer identifier, wherein the entity is a payment processing organization or an issuer; and receive a selection of the valid offer to complete the transaction.

These and other embodiments of the invention are described in further detail below.

BRIEF DESCRIPTION OF THE DRAWINGS

FIG. 6 shows a screen shot of an access device displaying different totals based on a particular payment method according to an embodiment of the invention.

DETAILED DESCRIPTION

Figure 1:
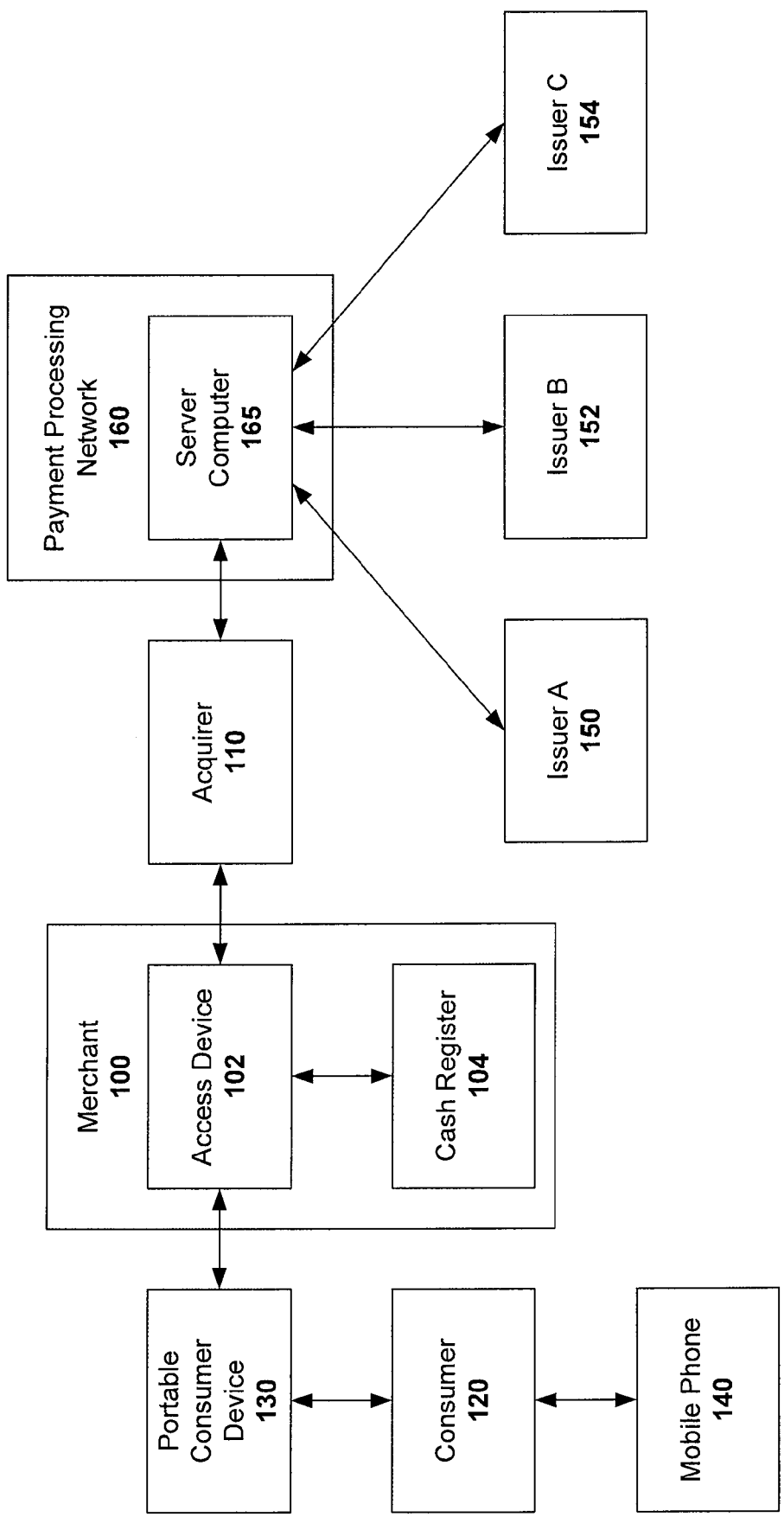
FIG. 1 shows an exemplary block diagram of a system for providing offers from multiple entities to a consumer according to embodiments of the invention.

Different entities may attempt to influence consumer behavior for different reasons. For example, a first party may include an issuing bank who may only care if a credit card being used is issued from the issuing bank. A second party may include a payment processing organization (e.g., Visa, a third party processor, etc.) who may only care if the payment processing organization's card is used. A third party may be a merchant who may only care if purchases are made at that merchant.

Embodiments of the invention can be used to introduce different types of coupon offers or other types of offers during a transaction. Such offers may include issuer coupons, payment processing organization coupons (e.g., acquirer coupons), merchant coupons, manufacturer coupons, etc.

In accordance with embodiments of the present invention, a point of sale terminal is configured to provide and/or redeem coupons only if appropriate rules are satisfied. For example, a payment processing organization offer may be redeemable by a consumer or provided to a consumer only if a payment processing organization branded credit card is used. In another example, an issuer (e.g., Citibank) may provide or redeem an offer if the consumer uses an issuer-specific credit card. In response to receiving various offers from the merchant, payment processing organization, or issuer, the consumer could then select a particular form a payment based upon the best offer that is provided to the consumer, and/or provide offers to encourage the consumer to buy specific products.

Some specific examples of coupon offers from different entities are provided below. In some embodiments of the invention, these different types of offers can be processed by a single access device (e.g., point of sale terminal), or could be processed by a server computer (e.g., residing at a payment processing organization or another location). The access device or the server computer could communicate with each of these entities during a payment transaction to determine which offers are valid.

Partner merchant issued offers: Here, a merchant sets the goals of an offer. Although the merchant may care about the type of payment form that is used (e.g., cash vs. credit card), the merchant is generally not concerned with the brand of payment that is being used by a consumer as long as the consumer accepts that brand of payment. The merchant's goal is to persuade consumers to buy the merchant's products or services, and to potentially purchase specific products or services (e.g., items that are overstocked).

Payment processing organization (e.g., acquirer) issued offers: The payment processing organization's goal may be to increase brand usage. The payment processing organization may only provide and redeem an offer if the consumer pays with a portable consumer device branded with the payment processing organization's service mark.

Offers issued by an issuer: The issuer is generally not concerned with the particular payment processing organization that a portable consumer device is affiliated with. For example, an issuer such as Bank of America may issue credit cards using the Visa and Mastercard brands. Typically, the issuer may be less concerned with whether the consumer uses a Visa or Mastercard branded credit card, as long as the consumer uses a card that is issued by Bank of America.

As used herein, a "transaction" may include, but is not limited to, the time when the consumer has selected goods or services to purchase and is ready to pay for them. For example, an exemplary transaction may include a time when a consumer selects products to purchase in a grocery store, and the selected products are scanned at a point of sale terminal such as a cash register. The consumer also provides at least one coupon at the point of sale terminal. The consumer is identified at the point of sale terminal by, for example, scanning a portable consumer device such as a credit or debit card. This scanned information (e.g., a SKU or stock keeping unit, an NLU or coupon identification number, an account number that identifies the consumer, etc.) may then be transmitted to a server computer. The server computer may then communicate with the entity associated with the offer (e.g., the merchant, payment processing organizations, and various issuers) to determine if rules associated with the offer are satisfied. If the rules are satisfied, the offer is applied to the goods to be purchased (e.g., the consumer is presented with a reduced total).

Illustratively, embodiments of the present invention are directed to offers from a variety of different entities that provide incentives to influence consumer behavior. Each offer is associated with certain rules that establish conditions to be satisfied in order for the offer to be valid. The merchant receives offers from a variety of sources (e.g., an acquirer, an issuer, or other external sources). The merchant may also generate its own offers to provide to consumers.

After a consumer selects goods in a store, the consumer approaches a point of sale terminal (e.g., a cash register or self-service check out terminal) to scan or otherwise enter the goods into a merchant computer. The consumer also provides a consumer identifier (e.g., a credit card number, alias, e-mail address, etc.) so that the identity of the consumer may be determined. The merchant computer retrieves a SKU or barcode value associated with the scanned goods, and any information associated with the consumer identifier. The consumer also provides at least one offer that may apply to the transaction. A server computer communicates with an entity associated with the offer (e.g. the merchant computer, an acquirer computer, and/or various issuer computers) to determine if the rules associated with the offer are satisfied. If the rules associated with the offer are satisfied, the offer is validated and a discounted total is presented to the consumer at the point of sale terminal. The point of sale terminal may also prompt the consumer to submit payment. The consumer then selects to pay for the goods.

Figure 2:
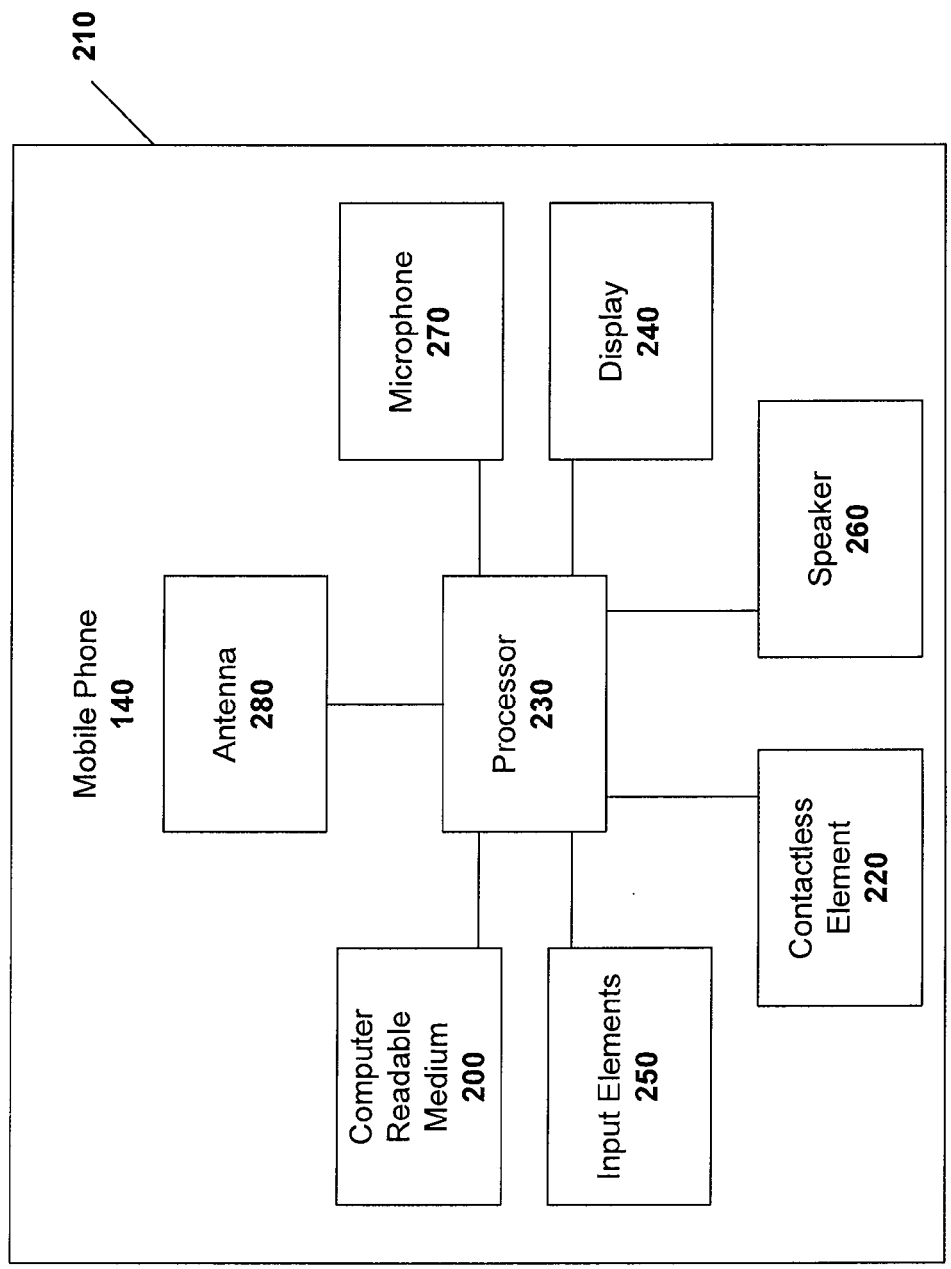
FIG. 2 shows an exemplary block diagram of some elements that may be present in a mobile phone according to an embodiment of the invention.

FIG. 1 shows an exemplary block diagram of a system for providing offers from multiple entities to a consumer in accordance with embodiments of the invention. The system includes a merchant 100 and an acquirer 110 associated with the merchant 100. In a typical payment transaction, a consumer 120 may purchase goods or services at the merchant 100 using a portable consumer device 130 or a mobile phone 140. FIG. 2 shows an exemplary block diagram of some elements that may be present in the mobile phone 140 according to an embodiment of the invention. The acquirer 130 can communicate with issuers (A, B, and C) 150, 152, 154 via a payment processing network 160 having a server computer 165.

The acquirer 130 is typically a bank that has a merchant account. The issuers 150, 152, 154 may each also be a bank, but could be any business entity such as a retail store. Some entities are both acquirers and issuers, and embodiments of the invention include such entities. Each issuer 150, 152, 154 may operate its own server computer (not shown), which may have a computer readable medium comprising code for performing the functions that the issuer 150, 152, 154 performs. An issuer database (not shown) comprising account number information and other information may be operatively coupled to the server computer 165.

The consumer 120 may be an individual or an organization such as a business that is capable of purchasing goods or services.

The portable consumer device 130 may be in any suitable form. For example, suitable portable consumer devices can be hand-held and compact so that they can fit into a consumer's wallet and/or pocket. Example portable consumer devices may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, contactless cards (e.g., an RFID card), payment cards, security cards, access cards, smart media, transponders, and the like. The portable consumer devices can also be debit devices (e.g., a debit card), credit devices (e.g., a credit card), or stored value devices (e.g., a stored value card).

The payment processing network 160 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

Figure 3:
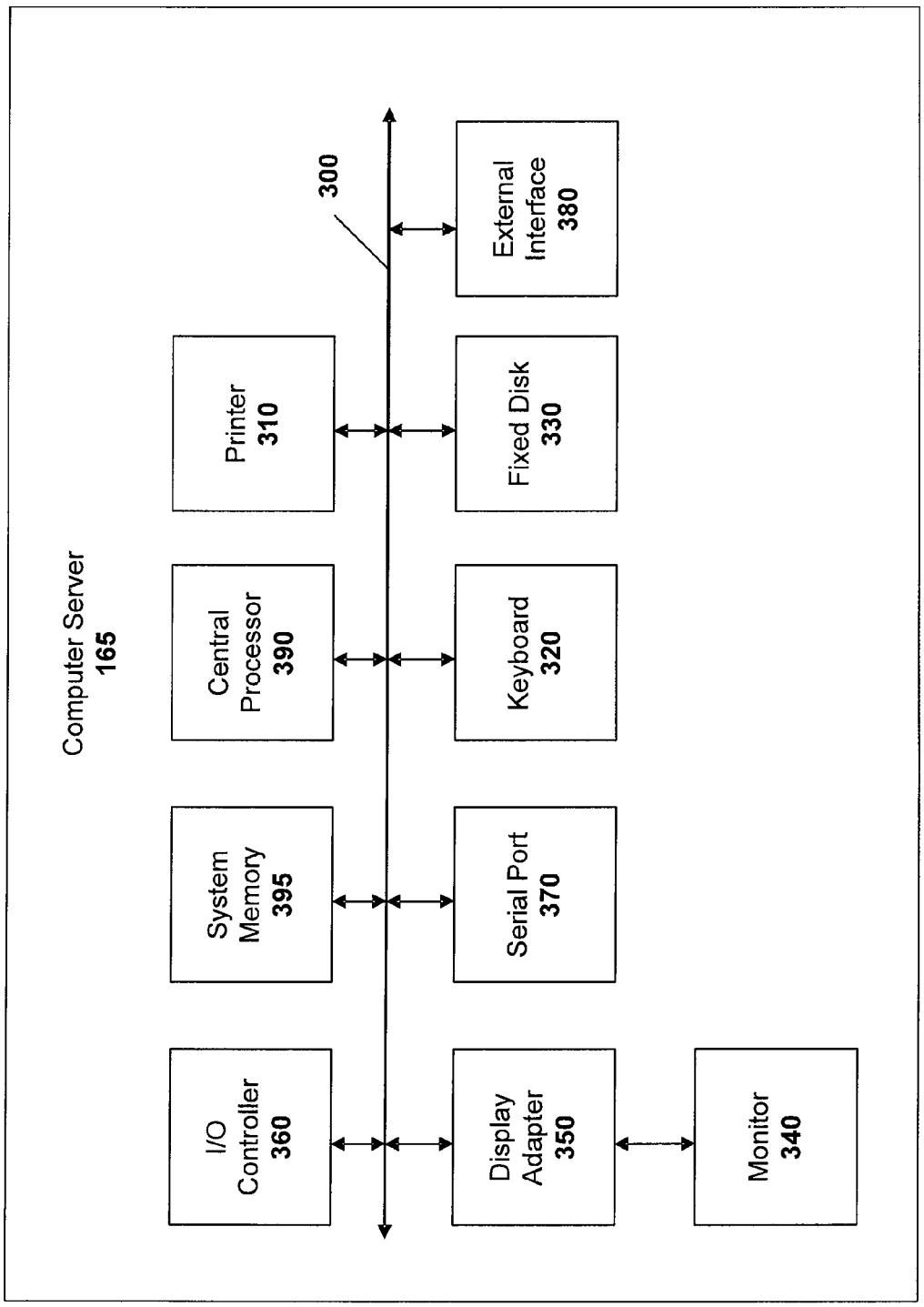
FIG. 3 shows an exemplary block diagram of some elements that may be present in a server computer according to an embodiment of the invention.

The server computer 165 of the payment processing network 160 is typically a powerful computer or cluster of computers. For example, the server computer 165 can be a large mainframe, a minicomputer cluster, or a group of servers functioning as a unit. In one example, the server computer 165 may be a database server coupled to a Web server. FIG. 3 shows an exemplary block diagram of some elements that may be present in the server computer 165 according to an embodiment of the invention. The payment processing network 160 may use any suitable wired or wireless network, including the Internet.

Figure 4:
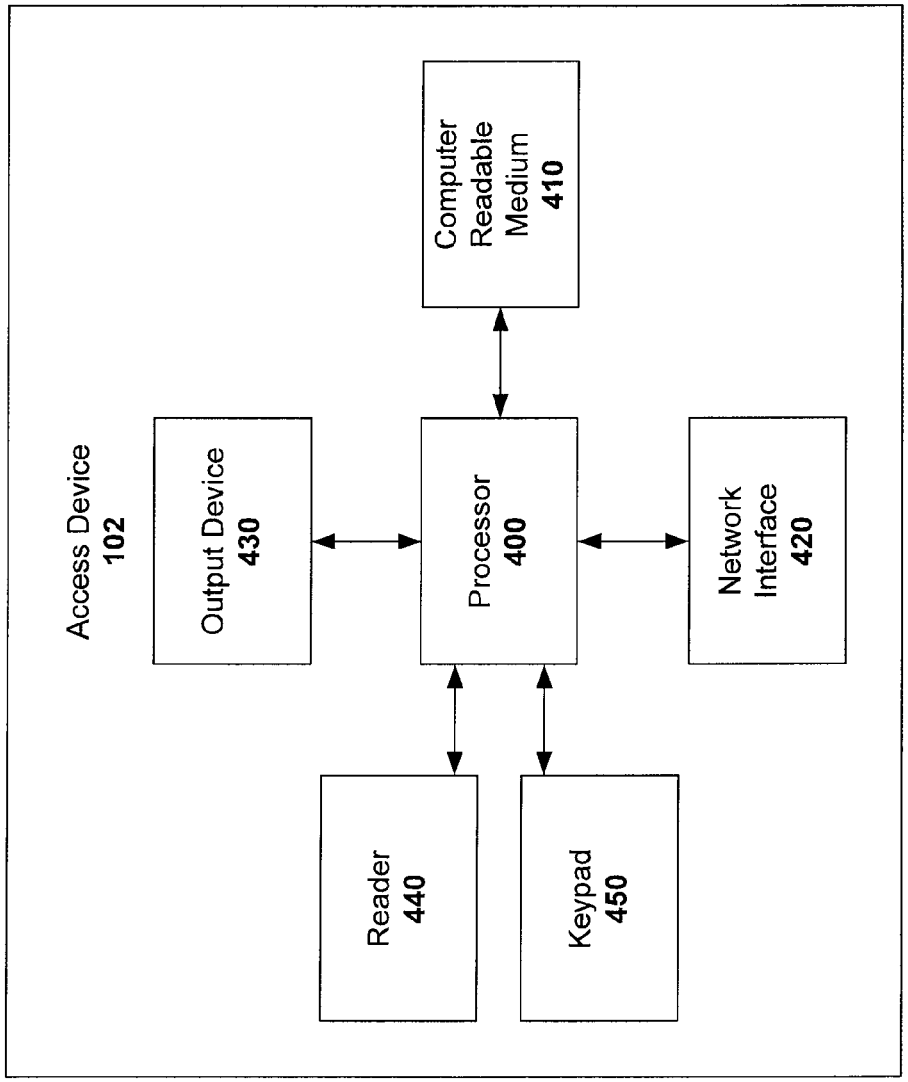
FIG. 4 shows an exemplary block diagram of some elements that may be present in an access device according to an embodiment of the invention.

The merchant 100 includes an access device 102 that can interact with the portable consumer device 130 and the mobile phone 140. FIG. 4 shows an exemplary block diagram of some elements that may be present in the access device 102 according to an embodiment of the invention. The merchant also includes a cash register 104 coupled to the access device 102.

In a typical purchase transaction, the consumer 120 purchases goods or services at the merchant 100 using the portable consumer device 130. The consumer's portable consumer device 130 interacts with the access device 102. For example, the consumer 120 may swipe a credit card through a reader of the access device 102. Alternatively, the reader may include a contactless reader, and the portable consumer device 130 may be a contactless device such as the mobile phone 140.

An authorization request message is then forwarded to the acquirer 110. After receiving the authorization request message, the acquirer 110 sends the authorization request message to the payment processing network 160. The server computer 165 forwards the authorization request message to the issuer 150, 152 or 154 of the portable consumer device 130.

After the issuer 150, 152 or 154 receives the authorization request message, the issuer 150, 152 or 154 sends an authorization response message back to the payment processing network 160 to indicate whether or not the current transaction is authorized. The server computer 165 forwards the authorization response message back to the acquirer 110. The acquirer 110 sends the response message back to the merchant 100.

After the merchant 100 receives the authorization response message, the access device 102 may provide the authorization response message to the consumer 120. The authorization response message may be displayed on a touch screen, or may be printed out on a receipt.

At the end of the business day, a clearing and settlement process may be conducted by the payment processing network 160. The clearing process exchanges financial details between the acquirer 110 and the issuer 150, 152, 154 to facilitate posting to a consumer's account and reconciliation of the consumer's settlement position.

Some of the embodiments described below may use a payment processing system like the one described above, or any suitable combination of components in the payment processing system.

In accordance with embodiments of the present invention, the system for providing coupon offers from multiple entities to a consumer is described below with reference to FIG. 1. The offers may be provided by the merchant 100, the acquirer 110, the issuer 150, 152, 154, or any other entity seeking to influence consumer behavior such as the manufacturer of goods offered for sale by the merchant 100.

Each issuer 150, 152, 154 may provide offers. The acquirer 110 may also generate offers. The merchant 100 may receive offers from other external sources such as from a manufacturer of goods offered for sale at the merchant 100. The merchant 100 may also generate its own offers to provide to the consumer 120. In one embodiment, the merchant 100 decides which offers to accept and which offers to decline. For example, an acquirer offer may conflict with an issuer offer. Thus, the merchant 100 may decide to provide only the acquirer offer to consumers.

Each offer is associated with one or more rules. The rules establish conditions to be satisfied for the offer to be valid. For example, an offer may be provided to a consumer that is valid only when the consumer uses a particular credit card. By using the credit card that corresponds to the offer, the consumer may receive a reduced price for the purchased goods or other incentives such as frequent flyer points. In another example, the rules may establish that an offer is only valid for a particular time period. Specifically, to provide an incentive for consumers to shop during off-peak hours, an offer may correspond to a particular time of day (e.g., the first two hours of retail operation). In another embodiment, the offer may correspond to the identity of the consumer combined with a particular day of the week or month (e.g., senior citizen discount on the third Tuesday of the month). Similarly, an offer may be provided for seasonal items after the season has ended. For example, summer merchandise discount offers may be valid during the months of September and October in an attempt to unload overstocked items.

The consumer 120 initiates a transaction by scanning merchandise that may be purchased at the merchant 100. For example, after selecting goods to purchase at a retail outlet, the consumer 120 may approach a cashier or self-service check-out terminal to pay for the items. The transaction may be initiated when the consumer 120 or a cashier scans or keys in the items to be purchased using the cash register 104. Any coupons or other offers may also be submitted using the cash register 104 or the access device 102. For example, paper coupons may be scanned at the cash register 104 and electronic offers stored on the mobile phone 140 may be provided to the access device 102.

A consumer identifier is provided during the transaction to identify the consumer. In one embodiment, the consumer 120 is identified at the access device 102 by the mobile phone 140. In another embodiment, the consumer 120 is identified by scanning the portable consumer device 130 (e.g., a credit card, a savings card associated with the merchant, a contactless card, etc.) at the access device 102. The consumer identifier may correspond to the account number associated with the scanned payment card. In another embodiment, the consumer 120 identifies himself by entering a personal identification code at the access device 102 using a touch screen or some other input/output device.

After the consumer identifier and the item information are entered into the access device 102, the offers are validated. The access device 102 identifies the entity associated with an applicable offer, and may then route the appropriate message to the entity associated with the applicable offer. The logic to do this may reside in hardware and/or software in the access device 102 or at a computer (e.g., a backend merchant computer) accessible to the access device 102. In one embodiment, more than one offer may apply to the same item. If the offer is associated with the merchant 100, the offer is validated at the merchant 100 to determine whether the rules that apply to the offer are satisfied. If the offer is associated with the acquirer 110, the offer and the consumer identifier are forwarded to the acquirer 110 and a determination is made whether the offer is valid. Similarly, if the offer is provided by an issuer 150, 152, 154, the offer and the consumer identifier are forwarded to the corresponding issuer 150, 152, 154 via the server computer 165 to determine the validity of the offer. In one embodiment, an offer is validated when the terms of the offer are satisfied. This may be done by matching conditions associated with the offer to a rules engine (not shown). The rules engine may be located at the merchant 100, the acquirer 110, the server computer 165, and/or the issuers 150, 152, 154.

For example, an offer provided by an issuer may only be valid if the consumer 120 purchases a quantity of three or more of a particular item. After the consumer 120 provides an offer indicator (e.g., an electronic coupon code) to the access device 102, it retrieves the three or more item rule from the rules engine from the issuer which provides the offer via the server computer 165, and then accesses the cash register 104 to identify whether three or more items have been purchased. The offer will not be validated if less than three of that item have been purchased.

In one embodiment, more than one rule may apply to an offer. For example, an offer may only be valid for a specific form of payment when an account balance associated with the specific form of payment is more than a predetermined amount. Thus, if the consumer 120 uses a different form of payment or if an account balance associated with the valid form of payment is less than the predetermined amount, the offer will not be validated.

Any number of rules may be associated with any offer. Example rules include: the type of payment, the time of day, the day of the week, the day of the month, the month of the year, the total quantity of items to be purchased, the quantity of a particular item to be purchased, consumer characteristics (e.g., age, gender, resident address, income level), etc. As one having ordinary skill in the art would appreciate, the list of example rules is not exhaustive and additional rules could be associated with an offer without departing from the spirit and scope of embodiments of the invention.

In accordance with one type of offer, the offer may be associated with the type of portable consumer device 130 that the consumer 120 used to identify himself (e.g., a credit card). The offer is validated by determining that the credit card that the consumer swiped at the access device 102 corresponds to the credit card that is associated with the offer. In one embodiment, the access device 102 may display a discounted amount to provide an incentive to pay using the credit card associated with the offer. Thus, the user is prompted to submit payment using the previously swiped credit card. Alternatively, the consumer 120 may be informed that the discount will be applied to the consumer's monthly credit card statement.

In one embodiment, the access device 102 may display different amounts based on the form of payment used by the consumer 120. Specifically, the access device 102 may display one amount if a particular credit card is used, another amount if a different credit card is used, and still another amount if payment is made by cash, check or a debit card. The consumer 120 then selects a payment method at the access device 102. If the consumer 120 presents a new form of payment at the access device 102 (e.g., a credit card that had not been previously used at the merchant 100), information associated with the new form of payment is stored at the merchant 100. Thus, if the same form of payment is used at a later date, the access device 102 will recognize the consumer 120 and may provide offers associated with that form of payment.

In another example, the offer may provide incentives such as free or discounted items, or reward points based on a particular item that the consumer 120 has selected for purchase. Specifically, the consumer 120 may purchase ground coffee and the access device 102 provides this product information to an issuer that seeks to provide offers to consumers who purchase coffee. The issuer may then provide an offer to the consumer 120 at the access device 102 to receive a free cup of coffee at a nearby coffee retailer. The consumer 120 may accept the offer at the access device 102. In one embodiment, the number of accepted offers is limited. For example, an offer for a free cup of coffee may be limited to thirty accepted offers on any given day.

The access device 102 sends the payment information provided by the consumer 120 to the cash register 104 to complete the purchase transaction. The access device 102 may begin reconciling the remittance for the offer. For example, if the offer was provided by an issuer 150, 152 or 154, the merchant 100 may request and retrieve the amount corresponding to the offer (e.g., the discounted amount) from that issuer. In one embodiment, offer remittance occurs at the end of the day during the clearing and settlement process.

FIG. 2 shows a block diagram of some components of the mobile phone 140. The phone 140 may comprise a computer readable medium 200 and a body 210. The computer readable medium 200 may be present within the body 210, or may be detachable from it. The body 210 may be in the form of a plastic substrate, housing, or other structure. The computer readable medium 200 may be a memory that stores data and may be in any suitable form including a magnetic stripe, a memory chip, etc.

The computer readable medium 200 may comprise code for performing any of the functions described herein. For example, the computer readable medium 200 may comprise code for identifying a consumer at an access device. The computer readable medium 200 may also comprise code for communicating with an access device to identify offers corresponding to items scanned by the phone 140.

The phone 140 may further include a contactless element 220, which is typically implemented in the form of a semiconductor chip (or other data storage element) with an associated wireless transfer (e.g., data transmission) element, such as an antenna. Data or control instructions transmitted via a cellular network may be applied to the contactless element 220 by a contactless element interface (not shown). The contactless element interface functions to permit the exchange of data and/or control instructions between the mobile device circuitry (and hence the cellular network) and the contactless element 220.

The contactless element 220 is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the phone 140 and the payment processing network 160 or it can be used to exchange data between the phone 140 and the access device 102. Thus, the phone 140 is capable of communicating and transferring data and/or control instructions via both cellular network and near field communications capability.

The phone 140 may also include a processor 230 (e.g., a microprocessor) for processing the functions of the phone 140 and a display 240 to allow the consumer to view offers associated with items that may be purchased and other information and messages. The phone 140 may further include input elements 250 to allow a user to input information into the phone 140, a speaker 260 to allow the user to hear voice communication, music, etc., and a microphone 270 to allow the user to transmit her voice through the phone 140. The phone 140 may also include an antenna 280 for wireless data transfer (e.g., data transmission).

FIG. 3 shows an exemplary block diagram of some elements that may be present in the computer server 165 according to an embodiment of the invention. The subsystems shown in FIG. 3 are interconnected via a system bus 300. Additional subsystems such as a printer 310, a keyboard 320, a fixed disk 330, a monitor 340, which is coupled to a display adapter 350, and others are shown. Peripherals and input/output (I/O) devices, which couple to an I/O controller 360, can be connected to the computer system by any number of means known in the art, such as a serial port 370. For example, the serial port 370 or an external interface 380 can be used to connect the computer apparatus to a wide area network such as the Internet, a mouse input device, or a scanner. The interconnection via the system bus 300 allows a central processor 390 to communicate with each subsystem and to control the execution of instructions from a system memory 395 or the fixed disk 330, as well as the exchange of information between subsystems. The system memory 395 and/or the fixed disk 330 may embody a computer readable medium.

FIG. 4 shows an exemplary block diagram of some elements that may be present in the access device 102 according to an embodiment of the invention. The access device 102 may comprise a processor 400, a computer readable medium 410, a network interface 420, an output device 430, a reader 440, and a keypad 450 operatively coupled to the processor 400.

The processor 400 may be embodied by one or more microprocessors, and the computer readable medium 410 may use any suitable electrical, magnetic or optical means of data storage. The computer readable medium 410 may store computer code for performing the functions of the access device 102. For example, the computer readable medium 410 may store instructions or code for communicating with the issuer of the consumer's portable consumer device, the payment processing organization associated with the consumer's portable consumer device, the merchant selling the item to be purchased, and the manufacturer of the item, during the transaction, or even before the transaction, after it receives a consumer identifier such as a payment card account number.

The network interface 420 may be any suitable interface that will allow the access device 102 to communicate with external apparatuses. The network interface 420 allows the access device 102 to communicate with the acquirer 110 and the payment processing network 160.

The reader 440 may include any suitable contact or contactless mode of operation. For example, exemplary card readers can include RF (radio frequency) antennas, magnetic stripe readers, etc. to interact with the portable consumer device 130 such as a credit card or a debit card. The reader 440 may be used to enter bill information into the access device 102.

The keypad 450 may be an ordinary keypad that is associated with a point of sale terminal. The keypad 450 may be embodied by a number of depressible buttons, or could be embodied on a touch screen on a display. The keypad 450 may be used to enter bill information into the access device 102.

Figure 5:
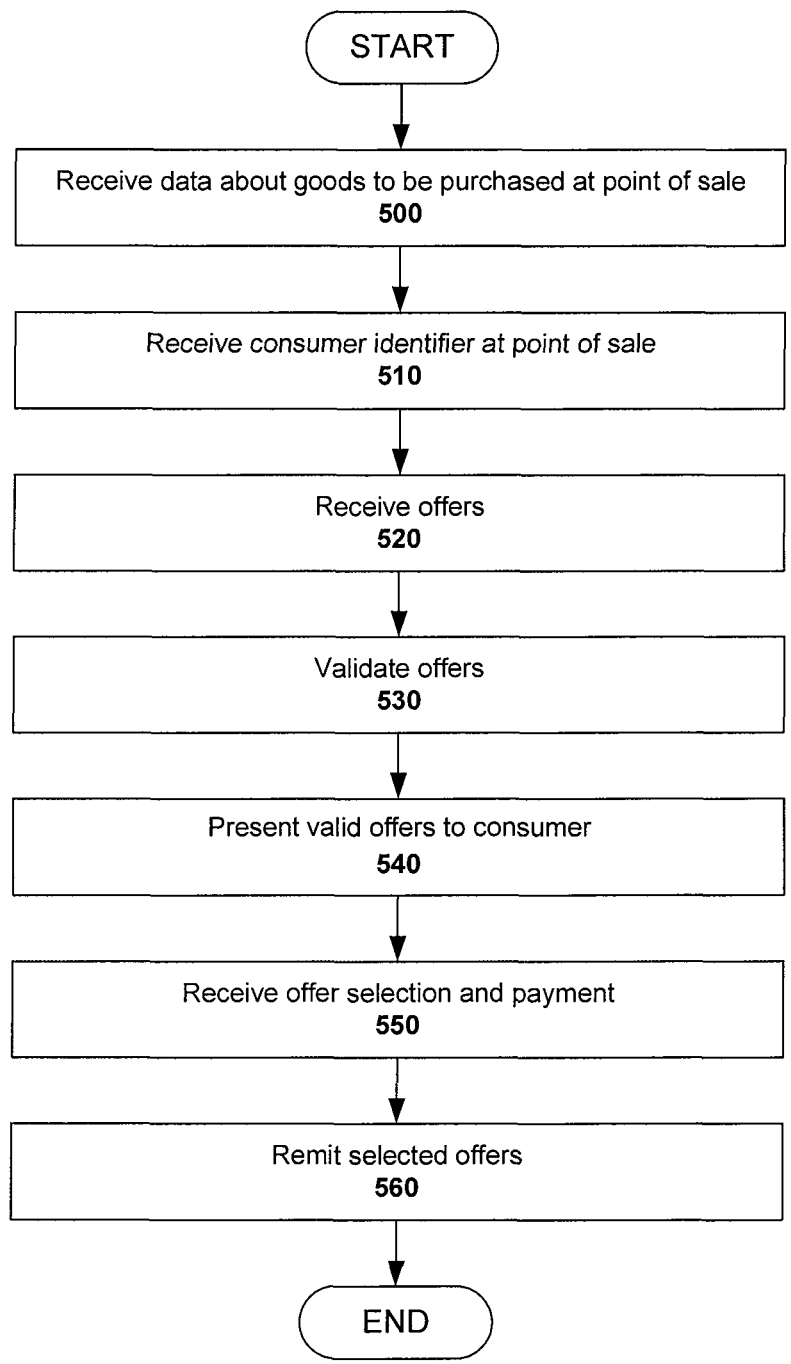
FIG. 5 shows a flow diagram of a method for providing offers to a consumer according to embodiments of the invention.

FIG. 5 shows a flow diagram of a method for providing offers to a consumer in accordance with embodiments of the invention. The offers may be provided by any entity that seeks to provide an incentive to consumers to purchase a product or service, to shop at a particular time, to use a particular form of payment, or to otherwise influence consumer behavior. Each offer is associated with one or more different rules that establish conditions to be satisfied for the offer to be valid.

Offers may be associated with an issuer. The acquirer may also generate offers. The merchant may generate offers to provide to the consumer. Offers may also be provided to the merchant from other external sources such as a product manufacturer or a service provider such as a payment processing organization. The provider of the offer determines which rules apply to the offer. In one embodiment, the merchant determines which offers to provide to consumers and which offers to decline. For example, if an external source and the merchant provide an offer for the same item, the merchant may decline to validate the external source offer in order to promote its own offer for that item.

The consumer shops for goods at a retail outlet. The goods are scanned by the consumer or a cashier at a point of sale terminal (e.g., cash register or self-service checkout terminal) (step 500). Information corresponding to items to be purchased are entered via a bar code reader or by keying in the item information directly into a cash register.

The consumer is identified at the point of sale terminal using an access device or a mobile phone (step 510). For example, the consumer may identify himself using a consumer identifier (e.g., a mobile phone unique identifier or an account number associated with a payment card). The consumer identifier may also be directly entered at the point of sale terminal as, for example, a personal identification number.

The consumer may provide offers to the access device (step 520). The offers may be paper coupons, electronic coupons stored on the mobile device, or any other type of offer that may be provided at the merchant.

The offers are then validated based on rules associated with the offers (step 530). The offers are validated by accessing a rules engine associated with the entity which provides the offer to ensure that the conditions established by the rules are satisfied. In accordance with one type of offer, a determination may be made whether the credit card provided to identify the consumer corresponds to the credit card applicable to the offer. If the credit cards do not correspond, the offer is not validated. Thus, the consumer cannot take advantage of the incentive associated with the offer. In another example, a rule may be established to provide an offer for a particular consumer. After the rule is retrieved from the rules engine of the entity which provides the offer, a determination is made whether the consumer corresponds to the target consumer of the offer. Illustratively, an offer may only be valid for a consumer living within a particular geographic location. Thus, the offer cannot be validated until the consumer's current resident address is verified.

In one embodiment, the consumer identifier such as a payment card account number is used to validate offers associated with the consumer. For example, the access device may receive a consumer identifier such as a payment card account number, and may communicate with the issuer associated with the payment card account number. Information regarding the consumer's identity may then be sent from the issuer to the access device. The access device may identify the consumer as being over the age of sixty-five. Thus, any offers associated with senior citizens would be validated.

After the offers are validated (or invalidated), the valid offers are presented to the consumer (step 540). The applicable offers may be provided to the consumer by, for example, the access device or the mobile phone. In accordance with one type of offer, the access device or the mobile phone may display the offers that are applicable to the consumer and the goods selected for purchase. In accordance with another type of offer, as shown in FIG. 6, the output device 430 of the access device 102 displays one amount if a payment card associated with a particular payment processing organization (e.g., Payment Processing Organization Z) is used, another amount if a payment card by a particular issuer is used (e.g., Issuer A), another amount if a particular payment card by a particular issuer and by a particular payment processing organization is used, and still another amount if payment is made by cash or check. The consumer may then select a particular form of payment to accept the offer (e.g., pay using a card that is branded with Issuer A and Payment Processing Organization Z) or may select to decline the offer (e.g., pay by cash).

The consumer selects the valid offers to accept and pays for the goods (step 550). For example, using a touch screen on the access device, the consumer may select an offer corresponding to the payment card used to identify the consumer to accept the discounted amount that would apply when payment is made using that payment card. In another example, the consumer may select a coupon for a discount on goods or services associated with a purchased item.

The valid offers are remitted by requesting payment associated with the incentive from the entity which provided the offer (step 560). For example, if the offer was provided by an issuer, the merchant may request and retrieve the amount corresponding to the offer (e.g., the discounted amount) from that issuer. In one embodiment, offer remittance occurs at the end of the day during the clearing and settlement process.

As can be seen from the above description, embodiments of the invention have a number of advantages. For example, multiple entities may provide coupon offers to a consumer. The coupon offers provide incentives to influence consumer behavior in such a way that benefits the offer provider. The offers may be established to provide non-traditional incentives. Such offers may be issuer coupons, acquirer coupons, merchant coupons, or coupons from other external sources (e.g., a manufacturer of goods that the merchant offers for sale, other retailers located in the vicinity of the merchant). The provider of the offer associates the offer with certain rules that establish conditions to be fulfilled for the offer to be valid. An access device is configured to provide or redeem the offer coupons only if the rules are satisfied.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
   receiving, by an access device from a consumer during a transaction between the consumer and a merchant, a consumer identifier and a plurality of offer indicators, wherein the plurality of offer indicators are respectively associated with a plurality of offers provided by a payment processing organization and an issuer;
   identifying, by the access device and during the transaction, the payment processing organization and the issuer;
   sending, by the access device and during the transaction, the offer indicators to the payment processing organization and the issuer, respectively, after identifying the payment processing organization and the issuer during the transaction;

receiving, by the access device and during the transaction, validated offers from the payment processing organization and the issuer, respectively, wherein validation of each offer is based on one or more conditions associated with each offer;

determining, by the access device and during the transaction, different discounted transaction amounts associated with the plurality of offers provided the payment processing organization and the issuer;

presenting, by the access device and to the consumer during the transaction, different discounted transaction amounts associated with the plurality of offers provided by the payment processing organization and the issuer; and receiving, by the access device from the consumer during the transaction, a selection of one of the validated offers from the payment processing organization and the issuer.

2. The method of claim 1 wherein the consumer identifier is a payment card account number.

3. The method of claim 1 wherein the consumer identifier is a phone number.

4. The method of claim 1 further comprising, prior to validating:

retrieving, by the access device, one or more conditions associated with each of the offers in the plurality of offers.

5. The method of claim 1 wherein the access device is a point of sale terminal.

6. The method of claim 1 further comprising, receiving, by the access device information relating to items being purchased in the transaction, wherein validation of each offer is based on whether the items being purchased satisfy the one or more conditions.

7. The method of claim 1 wherein receiving, by the access device, the selection of one of the validated offers by the payment processing organization and the issuer from the consumer comprises receiving a selection of a discounted amount associated with the selected validated offer.

8. The method of claim 1 wherein the offer indicators are electronic coupon codes.

9. The method of claim 1 wherein receiving, by the access device, the selection of one of the validated offers by the payment processing organization and the issuer from the consumer comprises receiving a selection of a discounted amount associated with the selected validated offer, the selected validated offer being associated with the issuer, and wherein the selection is made by using a payment card issued by the issuer to pay the merchant for items purchased in the transaction.

10. The method of claim 1
wherein the plurality of offer indicators are respectively associated with a plurality of offers provided by the payment processing organization, the issuer, and the merchant;
wherein identifying, by the access device, the payment processing organization and the issuer which provide the plurality of offers comprises identifying, by the access device, the payment processing organization, the issuer, and the merchant which provide the plurality of offers;
wherein communicating, by the access device, with the payment processing organization and the issuer after identifying the payment processing organization and the issuer comprises communicating, by the access device, with the payment processing organization, the issuer, and the merchant after identifying the payment processing organization, the issuer, and the merchant;
wherein receiving, by the access device, the validated offers from the payment processing organization and the issuer comprises receiving, by the access device, the validated offers from the payment processing organization, the issuer, and the merchant;
wherein determining, by the access device, the different discounted transaction amounts associated with the plurality of offers provided the payment processing organization and the issuer comprises determining, by the access device, the different discounted transaction amounts associated with the plurality of offers provided the payment processing organization, the issuer, and the merchant;
wherein presenting, by the access device and to the consumer, the different discounted transaction amounts associated with the plurality of offers provided by the payment processing organization and the issuer comprises presenting, by the access device and to the consumer, the different discounted transaction amounts associated with the plurality of offers provided by the payment processing organization, the issuer, and the merchant; and
wherein receiving, by the access device, the selection of one of the validated offers by the payment processing organization and the issuer comprises receiving, by the access device, the selection of one of the validated offers by the payment processing organization, the issuer, and the merchant.

11. An access device comprising a processor, and a computer readable medium coupled to the processor, to implement a method comprising:

receiving, by the access device from a consumer during a transaction between the consumer and a merchant, a consumer identifier and a plurality of offer indicators, wherein the plurality of offer indicators are respectively associated with a plurality of offers provided by a payment processing organization and an issuer;

identifying, by the access device and during the transaction, the payment processing organization and the issuer;

sending, by the access device and during the transaction, the offer indicators to the payment processing organization and the issuer, respectively, after identifying the payment processing organization and the issuer during the transaction;

receiving, by the access device and during the transaction, validated offers from the payment processing organization and the issuer, respectively, wherein validation of each offer is based on one or more conditions associated with each offer;

determining, by the access device and during the transaction, different discounted transaction amounts associated with the plurality of offers provided the payment processing organization and the issuer;

presenting, by the access device and to the consumer during the transaction, the different discounted transaction amounts associated with the plurality of offers provided by the payment processing organization and the issuer; and receiving, by the access device from the consumer during the transaction, a selection of one of the validated offers from the payment processing organization and the issuer.

12. The access device of claim 11 wherein the consumer identifier is a payment card account number.

13. The access device of claim 11 wherein the consumer identifier is a phone number.

14. The access device of claim 11 wherein the method further comprises, prior to validating:
retrieving, by the access device, the one or more conditions associated with each of the offers in the plurality of offers.

15. The access device of claim 11 wherein the access device is a point of sale terminal.

16. The access device of claim 11 wherein the method further comprises, receiving, by the access device information relating to items being purchased in the transaction, wherein validation of each offer is based on each offer and whether the items being purchased satisfy the one or more conditions.

17. The access device of claim 11 wherein receiving, by the access device, the selection of one of the validated offers by the payment processing organization and the issuer from the consumer comprises receiving a selection of a discounted amount associated with the selected validated offer.

18. The access device of claim 11 wherein the offer indicators are electronic coupon codes.

19. The access device of claim 11 wherein receiving, by the access device, the selection of one of the validated offers by the payment processing organization and the issuer from the consumer comprises receiving a selection of a discounted amount associated with the selected validated offer, the selected validated offer being associated with the issuer, and wherein the selection is made by using a payment card issued by the issuer to pay the merchant for items purchased in the transaction.

20. The access device of claim 11
wherein the plurality of offer indicators are respectively associated with a plurality of offers provided by the payment processing organization, the issuer, and the merchant;
wherein identifying, by the access device, the payment processing organization and the issuer which provide the plurality of offers comprises identifying, by the access device, the payment processing organization, the issuer, and the merchant which provide the plurality of offers;
wherein communicating, by the access device, with the payment processing organization and the issuer after identifying the payment processing organization and the issuer comprises communicating, by the access device, with the payment processing organization, the issuer, and the merchant after identifying the payment processing organization, the issuer, and the merchant;
wherein receiving, by the access device, the validated offers from the payment processing organization and the issuer comprises receiving, by the access device, the validated offers from the payment processing organization, the issuer, and the merchant;
wherein determining, by the access device, the different discounted transaction amounts associated with the plurality of offers provided the payment processing organization and the issuer comprises determining, by the access device, the different discounted transaction amounts associated with the plurality of offers provided the payment processing organization, the issuer, and the merchant;
wherein presenting, by the access device and to the consumer, the different discounted transaction amounts associated with the plurality of offers provided by the payment processing organization and the issuer comprises presenting, by the access device and to the consumer, the different discounted transaction amounts associated with the plurality of offers provided by the payment processing organization, the issuer, and the merchant; and
wherein receiving, by the access device, the selection of one of the validated offers by the payment processing organization and the issuer from the consumer comprises receiving, by the access device, the selection of one of the validated offers by the payment processing organization, the issuer, and the merchant.

* * * * *